United States Patent
Bucher et al.

(10) Patent No.: US 6,676,171 B2
(45) Date of Patent: *Jan. 13, 2004

(54) INSERTION VERIFIER DUST CAP

(75) Inventors: Michael Bucher, Clinton Township, MI (US); Bruce McLauchlan, Clinton Township, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 170 days.

This patent is subject to a terminal disclaimer.

(21) Appl. No.: 09/966,935

(22) Filed: Sep. 28, 2001

(65) Prior Publication Data

US 2003/0094813 A1 May 22, 2003

Related U.S. Application Data

(63) Continuation of application No. 09/436,121, filed on Nov. 8, 1999, now Pat. No. 6,343,814.

(51) Int. Cl.[7] ................................................. F16L 37/12
(52) U.S. Cl. ......................................... 285/319; 285/39
(58) Field of Search ................................... 285/39, 319

(56) References Cited

U.S. PATENT DOCUMENTS

| | | | | |
|---|---|---|---|---|
| 4,927,185 A | * | 5/1990 | McNaughton | 285/39 |
| 5,219,188 A | * | 6/1993 | Abe et al. | 285/319 |
| 5,303,963 A | * | 4/1994 | McNaughton et al. | 285/319 |
| 5,378,025 A | * | 1/1995 | Szabo | 285/39 |
| 5,542,717 A | * | 8/1996 | Rea et al. | 285/319 |
| 5,593,188 A | | 1/1997 | McNaughton et al. | |
| 5,752,726 A | | 5/1998 | Fixemer | |
| 6,340,180 B1 | * | 1/2002 | Wisniewski | 285/319 |
| 6,343,814 B1 | * | 2/2002 | Bucher et al. | 285/319 |
| 6,347,815 B1 | * | 2/2002 | Kargula et al. | 285/319 |

FOREIGN PATENT DOCUMENTS

EP 0484690 5/1992

\* cited by examiner

*Primary Examiner*—David Bochna
(74) *Attorney, Agent, or Firm*—Jenner & Block, LLC

(57) ABSTRACT

A coupling assembly for providing a fluid connection comprising a female connector, a tube, a retainer and a cap. The female connector defines a bore. The bore extends axially inwardly into the connector from an entrance. An annular face is defined in the bore axially inwardly of the entrance. The tube is received within the bore. The tube has an enlarged upset. The retainer is disposed in the bore. The retainer has a member directly contacting the upset and extends to the annular face to retain the tube in the bore. The cap is slidably mounted on the tube and is attached to the female connector. The cap has a protrusion directly contacting the upset.

19 Claims, 3 Drawing Sheets

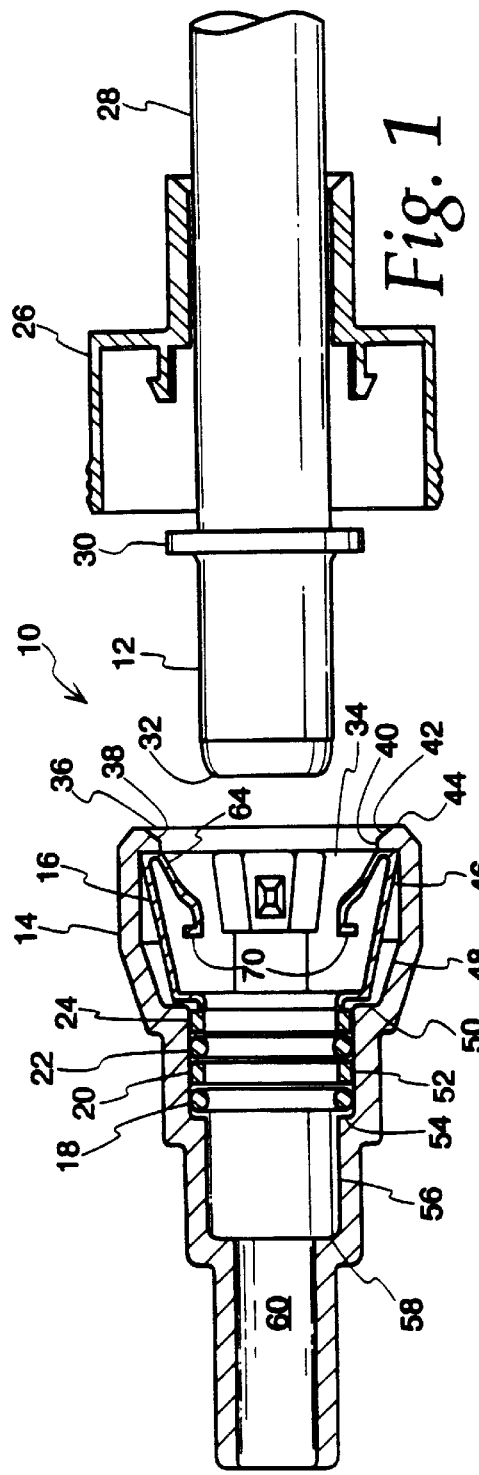
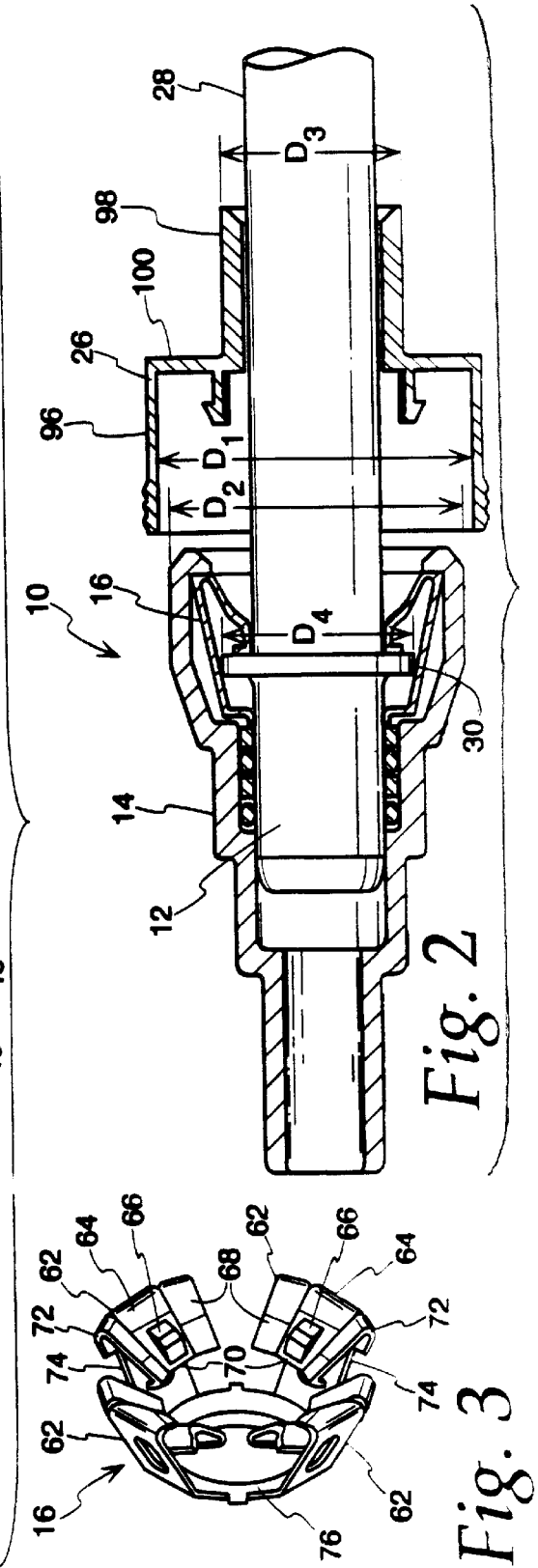

INSERTION VERIFIER DUST CAP

This is a continuation of application Ser. No. 09/436,121, filed Nov. 8, 1999, now U.S. Pat. No. 6,343,814. This invention relates to fluid line systems which include coupling assemblies, and more particularly, to a coupling assembly of the type for connecting a male member formed at the end of a tube in a hollow female connector.

BACKGROUND OF THE INVENTION

In the automotive and other fields, one type of coupling assembly often utilized to provide a fluid connection between two components or conduits is a quick connector coupling, which generally includes a male member received and retained in a female connector. Use of a quick connector coupling is advantageous in that a sealed and secured fluid line may be established with a minimum amount of time and expense.

A retainer is often used to secure the male member within the female connector. One such type of retainer includes a plurality of locking beams which extend between a radial upset formed on the male member and an annular face defined in the female connector. The abutment of the retainer with the radial upset at one end and the annular face at the other end prevents the withdrawal of the male member from the female connector. This type of retainer is prevalent in the art and has proven effective in many fluid line applications.

Nevertheless, such retainers have occasionally been prone to failure. During the connection of the male member in the female connector, the male member may be inserted insufficiently into the female connector for the upset formed on the male member to surpass the locking beams of the retainer. This insufficient insertion of the male member into the female connector allows the male member to be accidentally removed from the female connector with little effort.

Another concern associated with the use of a retainer having a plurality of locking beams is contaminants entering into the entrance of the female connector and being embedded between the locking beams. The presence of contaminants in the female connector can cause the male member, female connector or retainer to erode and fail prematurely. Furthermore, the presence of contaminants in the female connector prevents a tool from entering the female connector to release the retainer for removal of the male member from the female connector.

SUMMARY OF THE INVENTION

The present invention is a coupling assembly for providing a fluid connection comprising a female connector, a tube, a retainer and a cap. The female connector defines a bore. The bore extends axially inwardly into the connector from an entrance. An annular face is defined in the bore axially inwardly of the entrance. The tube is received within the bore. The tube has an enlarged upset. The retainer is disposed in the bore. The retainer has a member directly contacting the upset and extends to the annular face to retain the tube in the bore. The cap is slidably mounted on the tube and is attached to the female connector. The cap has a protrusion directly contacting the upset.

BRIEF DESCRIPTION OF THE DRAWINGS

FIG. 1 is a section view of a coupling assembly prior to insertion of a male member into a female connector.

FIG. 2 is a section view of the coupling assembly of FIG. 1 after the male member has been properly inserted into the female connector.

FIG. 3 is a perspective view of a retainer.

DETAILED DESCRIPTION OF THE INVENTION

Figure 4:
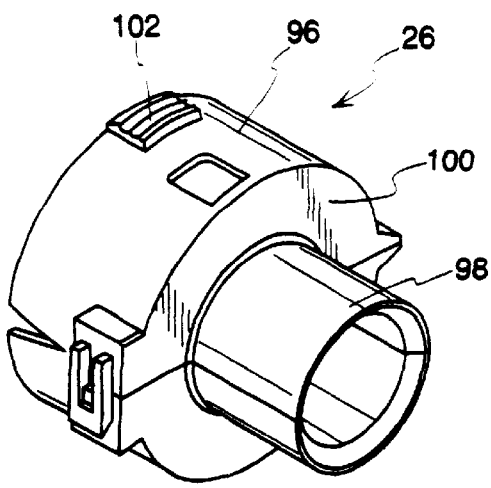
FIG. 4 is a perspective view of an insertion verifier dust cap.

FIGS. 1 and 2 illustrate a coupling assembly of the present invention. The coupling assembly 10 comprises a male member 12, a hollow female connector 14, a retainer 16, a first O-ring 18, a first spacer 20, a second O-ring 22, a second spacer 24 and an insertion verifier dust cap 26.

The male member 12 is formed at the end of a hollow and rigid tube 28 which forms a part of a fluid line system. The tube 28 may lead to a component in a fluid line system, or may itself be a portion of a component in a fluid line system. Male member 12 includes a radially enlarged annular flange or upset 30 formed at a given distance from the distal end 32 of the male member 12.

The female connector body 14 is hollow and defines an axial bore 34 extending axially inward from an entrance 36. The entrance 36 is defined by a radially inward extending rim 38 having an apex 40. The rim 38 is chamfered at the axially outward surface 42 to facilitate the insertion of the male member 12 into the connector body 14. Axially inward from the entrance 36 is a first annular face 44. Axially inward from the first annular face 44 is a first cylindrical surface 46 and a first conical surface 48 terminating at a second annular face 50. Axially inward from the second annular face 50 is a second cylindrical surface 52 terminating at a third annular face 54. Axially inward from the third annular face 54 is a third cylindrical surface 56 terminating at a fourth annular face 58. Located at the center of the fourth annular face 58 is an entrance to a reduced diameter cylindrical bore 60 forming the fluid line opposite the tube 28. The first annular face 44, together with the first cylindrical surface 46, the first conical surface 48, the second annular face 50, the second cylindrical surface 52, the third annular face 54, the third cylindrical surface 56 and the fourth annular face 58, define the axial bore 34.

The first O-ring 18, the first spacer 20, the second O-ring 22 and the second spacer 24 are inserted in the axial bore 34. The first O-ring 18, the first spacer 20, the second O-ring 22 and the second spacer 24 are situated radially inward of the second cylindrical surface 52.

Thereafter, the retainer 16 is inserted into the axial bore 34. The retainer 16 includes four circumferentially spaced legs 62 which abut the upset 30 of the male member 12 to retain the male member 12 in the axial bore 34 upon full insertion of the male member 12 into the female connector 14.

Each leg 62 includes a radially inner section 64 which abuts the upset 30 of the male member 12. A bump 66, formed on each radially inner section 64, provides a relatively great force resisting tube insertion. Braces 68 extend circumferentially from each circumferential side of the radial inner sections 64 to provide additional strength against buckling of the retainer.

The radially inner section 64 includes a lip 70 which abuts the upset 30 of the male member 12. The lip 70 is bent radially outwardly such that it contacts the upset 30 over a relatively great surface area. A rear bend 72 connects the radially inner section 64 with a radially outer section 74. A cylindrical forward ring 76 connects the plurality of circumferentially spaced legs 62. The ring abuts the second annular face 50 and the rear bend abuts the first abutment face 44 to retain the retainer 16 in the axial bore 34.

Figure 7:
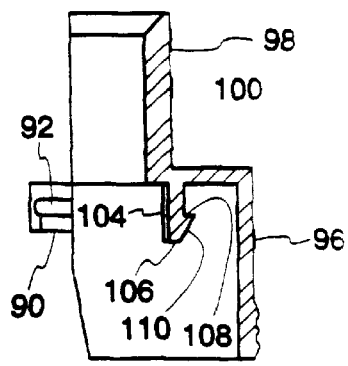
FIG. 7 is a cross-sectional view of the insertion verifier dust cap as taken along line 7—7 of FIG. 5.
Figure 6:
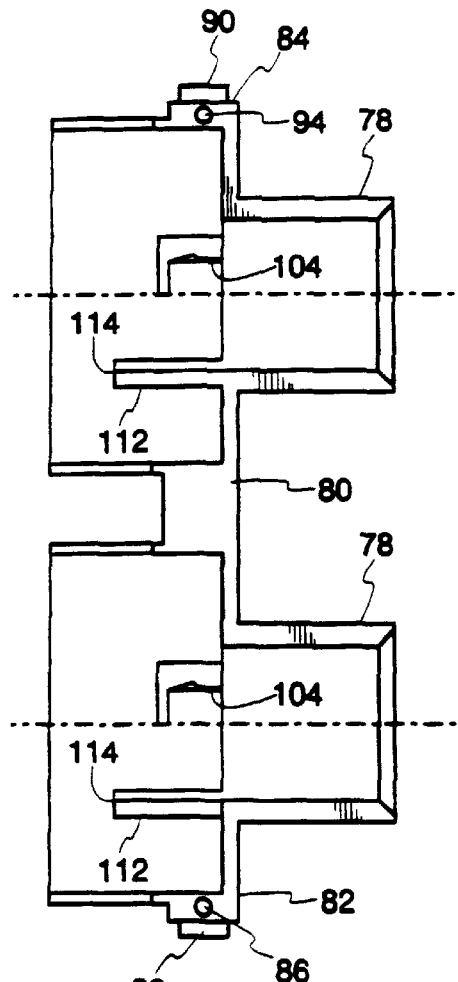
FIG. 6 is a side view of the insertion verifier dust cap of FIG. 4.
Figure 5:
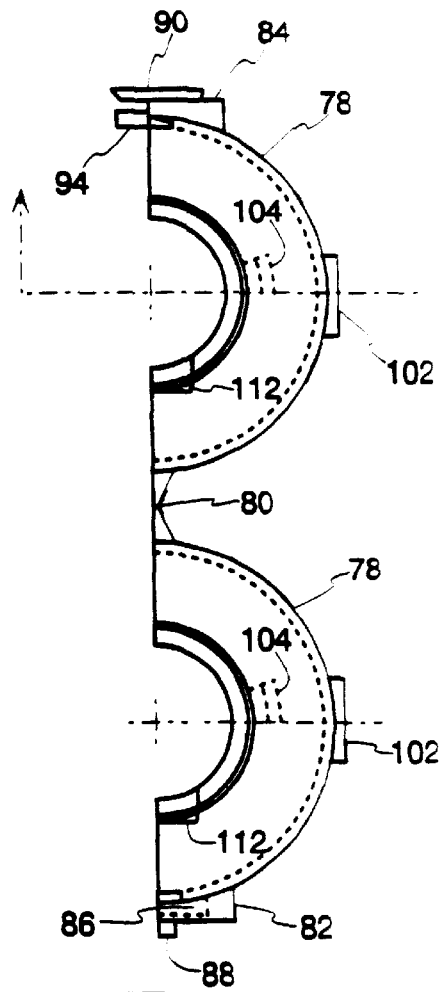
FIG. 5 is a front view of the insertion verifier dust cap of FIG. 4.
Figure 8:
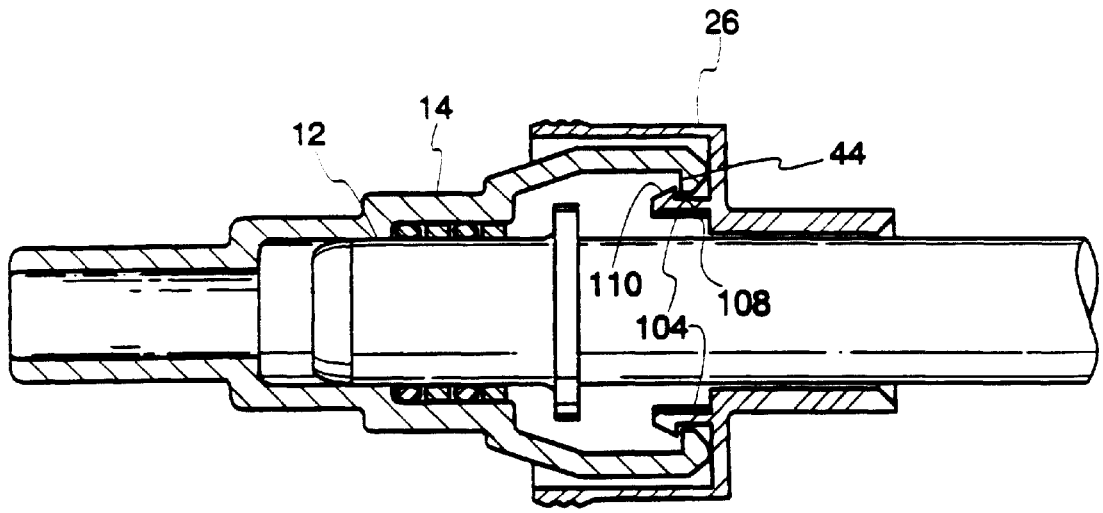
FIG. 8 is a section view of the coupling assembly of FIG. 2 after the insertion verifier dust cap has been attached to the female connector.
Figure 9:
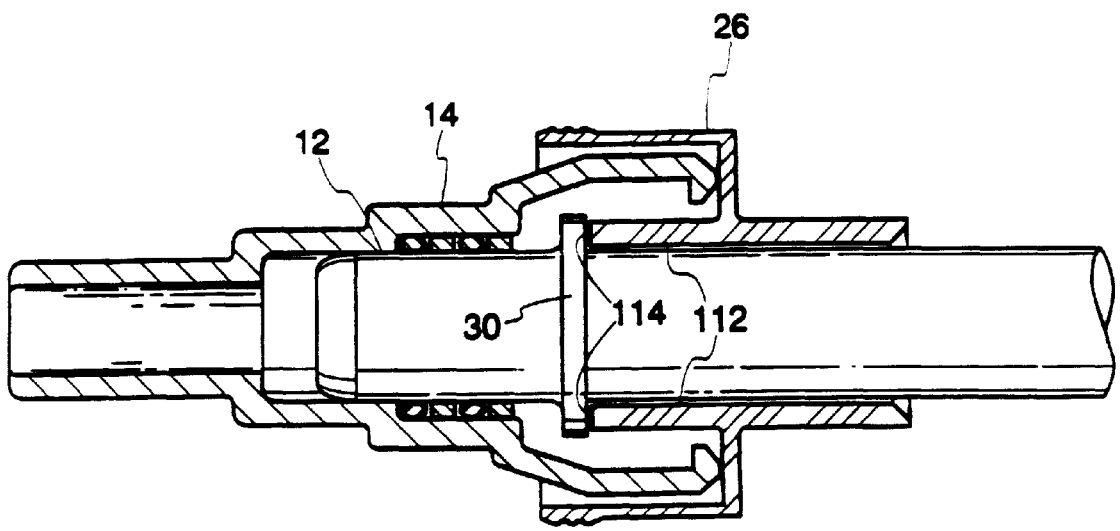
FIG. 9 is a section view taken ninety degrees from the coupling assembly of FIG. 8.

The insertion verifier dust cap 26 of the present invention is shown in FIGS. 4–7. The cap 26 is a dual diameter cylindrical shaped shell. The cap 26 can be opened axially as two shell halves 78 are connected by a hinge 80 on one side. The two shell halves 78 are snapped together by a rectangular housing 82 formed on the outer surface of one shell and a clasp 84 formed on the outer surface of the other shell. The rectangular housing 82 has a bore 86 defined therein and a protrusion 88 formed on the radially outer surface of the housing 82. The clasp 84 has a U-shaped catch 90 formed at the radially outer surface. The U-shaped catch 90 has a window 92 in the center for retaining the protrusion 88. Radially inward of the U-shaped catch 90 is an outwardly extending pin 94 for insertion into the bore 86 of the housing 82.

Once the clasp 84 and the housing 82 of the two shell halves 78 are snapped together, the two shell halves 78 form the dual diameter cylindrical shaped cap 26.

The cap 26 has a first cylindrical portion 96 having an enlarged diameter and a second cylindrical portion 98 having a reduced diameter. As illustrated in FIG. 2, the inner diameter $D_1$ of the first cylindrical portion 96 is sized to be at least as large as the outer diameter $D_2$ of the female connector 14 radially outwardly of the entrance 36, thus allowing the first cylindrical portion 96 to surround a portion of the connector body 14 radially outward and axially inward of the entrance 36. The first cylindrical portion 96 is connected to the second cylindrical portion 98 by an annular portion 100. Formed on the outer surface of the first cylindrical portion 96 and perpendicular to the abutting surfaces of the two shell halves 78 are a pair of grooved finger tabs 102.

Two circumferentially spaced protruding arms 104 are formed on the inner surface of the annular portion 100 of the cap 26. The arms 104 extend axially from the annular portion 100. The distal end of each arm includes a hook 106 extending radially outward. Each hook 106 has an axially inward surface 108 for abutment with the first annular surface 44 of the female connector 14 to retain the cap 26 to the female connector 14. Located axially outward from the axially inward surface 108 is a ramped surface 110 to facilitate the insertion of the arms 104 into the female connector 14.

Two circumferentially spaced protruding beams 112 are formed on the inner surface of the annular portion 100 of the cap 26 ninety degrees from the arms 104. The beams 112 extend axially from the annular portion 100. Each beam 112 has a terminal surface 114 for abutment with the upset 30 of the male member 12.

The coupling assembly 10 of the present invention functions as follows. The first O-ring 18, the first spacer 20, the second O-ring 22, the second spacer 24 and the retainer 16 are pre-assembled into the female connector 14. The first O-ring 18, the first spacer 20, the second O-ring 22 and the second spacer 24 are inserted into the axial bore 34 and situated radially inward of the second cylindrical surface 52. Thereafter, the retainer 16 is inserted into the axial bore 34 until the ring 76 abuts the second annular face 50 and the rear bend 72 abuts the first abutment face 44 to retain the retainer 16 in the bore 34.

The male member 12 is then inserted into the female connector 14. The terminal end 32 of the male member 12 is inserted through the entrance 36 of the female connector 14, between the radially inner section 64 of the retainer 16, through the ring 76 of the retainer 16, through the second spacer 24, the second O-ring 22, the first spacer 20 and the first O-ring 18, and finally into the portion of the axial bore 34 defined by the third cylindrical surface 56. The first O-ring 18 and the second O-ring 22 form a seal between the male member 12 and the axial bore 34 of the female connector 14. The upset 30 of the male member 12 then contacts the radially inner section 64 of the retainer 16. Upon further insertion of the male member 12 into the female connector 14, the upset 30 of the male member 12 applies an axially inward and a radially outward force, pushing the radially inner section 64 radially outward. When inserted properly, the male member 12 is inserted until the upset 30 of the male member 12 surpasses the lip 70 of the radially inner section 64. Once the upset 30 of the male member 12 surpasses the lip 70, the radially inner section 64 springs radially inward, abutting the upset 30 of the male member 12, and prevents the male member 12 from withdrawing from the female connector 14.

Once the male member 12 has been inserted into the female connector 14, the cap 26 is mounted around the tube 28 forming the male member 12 with the first cylindrical portion 96 axially toward the female connector 14. The cap 26 is mounted around the tube 28 by placing the inner surface of the second cylindrical portion 98 of one of the shell halves 78 around the tube. The other shell half 78 then pivots around the hinge 80 to surround the tube 28. To snap the two shell halves 78 together, the U-shaped catch 90 flexes radially outward until the protrusion 88 is situated within the window 92 of the U-shaped catch 90. The U-shaped catch 90 then springs radially inward and retains the protrusion 88 within the U-shaped catch 90. At the same time, the pin 94 is inserted into the bore 86 to provide axial and radial stability.

After the cap 26 is mounted on the tube 28, the cap 26 is slid axially toward the female connector 14. The cap 26 is rotationally aligned such that the arms 104 and the beams 112 are aligned between the legs 62 of the retainer 16 allowing the arms 104 and the beams 112 to fit between the legs 62 of the retainer 16. As the cap 26 is slid axially toward the female connector 14, the first cylindrical portion 96 surrounds at least a portion of female connector 14 radially outward and axially inward of the entrance to prevent contaminants from entering the entrance of the connector body.

If the male member 12 has been properly inserted into the female connector 14, such that the upset 30 of the male member 12 was inserted past the lips 70 of the radially inner sections 64, the hooks 106 of the arms 104 contact the rim 38 of the female connector 14 and the beams 112 fit between the legs 62 of the retainer 16. Since at least a portion of the ramped surface 110 has a diameter larger than the apex 40 of the rim 38, further force applied to the cap 26 in the axial direction causes the arms 104 to flex radially inward such that the diameter of the ramped surface 110 in contact with the rim 38 is the same diameter as the apex 40 of the rim 38. The cap 26 is slid axially until the rim 38 surpasses the ramped surface 110 of the hook 106. The arms 104 then spring radially outward wherein the axially inward surfaces 108 of the hooks 106 act as abutment surfaces against the first annular face 44, preventing the cap 26 from withdrawing from the female connector 14. Furthermore, upon full insertion of the arms 104 into the female connector 14, the terminal surfaces 114 of the beams 112 abut the upset 30 of the male member 12, preventing the male member 12 from withdrawing from the female connector 14.

If the male member 12 has not been properly inserted into the female connector 14, such that the upset 30 of the male member 12 was not inserted past the lips 70 of the radially inner surfaces 64 during the insertion of male member 12 into the female connector 14, the terminal surfaces 114 of the beams 112 abut the upset 30 of the male member 12 and push the male member 12 axially inward into the female connector 14. Just prior to the point where the rim 38 surpasses the ramped surfaces 110 of the hooks 106, the upset 30 of the male member 12 surpasses the lip 70 of the radially inner section 64. Therefore, the beams 112 of the cap 26 verify that the male member 12 has been properly inserted into the female connector 14 by pushing the upset 30 of the male member 12 axially inward until the male member 12 is properly inserted.

The cap 26 of the present invention can also be used as a release tool to withdraw the male member 12 from the female connector 14 after the male member 12 has been properly inserted into the female connector 14. To use the cap 26 as a release tool, the cap 26 is mounted around the tube 28 forming the male member 12 with the second cylindrical portion 98 axially toward the female connector 14. The cap 26 is mounted around the tube 28 by placing the inner surface of the second cylindrical portion 98 of one of the shell halves 78 around the tube 28. The other shell half 78 then pivots around the hinge 80 to surround the tube 28. The two shell halve 78 are snapped together and the cap 26 is slid axially toward the female connector 14. As the second cylindrical portion 98 of the cap 26 is inserted into the axial bore 34 of the female connector 14, the outer surface of the second cylindrical portion 98 contacts the radially inner sections 64 of the retainer 16. As the cap 26 is further inserted axially inward, the second cylindrical portion 98 pushes the radially inner sections 64 radially outward. The cap 26 is inserted axially inwardly until the terminal end of the second cylindrical portion 98 contacts the upset 30 of the male member 12. The outer diameter $D_3$ of the second cylindrical portion 98 is sized to at least as large as the diameter $D_4$ of the upset 30 of the male member 12. Thus, upon the terminal end of the second cylindrical portion 98 contacting the upset 30 of the male member 12, the diameter of the radially inner section 64 is expanded to be at least as large as the diameter $D_4$ of the upset 30 of the male member 12. Thereafter, the upset 30 of the male member 12 is able to fit through the radially inner section 64 and be withdrawn from the female connector 14.

Various features of the present invention have been described with reference to the above embodiment. It should be understood that modifications may be made without departing from the spirit and scope of the invention as represented by the following claims.

What is claimed is:

1. A coupling assembly for providing a fluid connection comprising:
    a female connector defining a bore, said bore extending axially inwardly into said connector from an entrance, an annular face being defined in said bore axially inwardly of said entrance;
    a tube received within said bore with an enlarged upset;
    a retainer disposed in said bore having a member contacting said upset and extending to said annular face defined in said bore to retain said tube in said bore; and
    a cap slidably mounted on said tube, said cap having a protrusion for abutment with said upset to assure said tube has been properly inserted into said female connector, said cap engagable with said annular face defined in said bore to attach said cap to said female connector.

2. The coupling assembly as claimed in claim 1 wherein said protrusion has a terminal surface for abutment with said upset.

3. The coupling assembly as claimed in claim 1 wherein said cap further has an arm abutting said annular face for attaching said cap to said female connector.

4. The coupling assembly as claimed in claim 3 wherein said protrusion is located ninety degrees from said arm.

5. The coupling assembly as claimed in claim 1 wherein said protrusion is a beam extending axially.

6. The coupling assembly as claimed in claim 1 wherein said cap further has a portion surrounding said entrance of said female connector.

7. The coupling assembly as claimed in claim 6 wherein said portion of said cap has a diameter at least as large as the outer diameter of said female connector radially outward of said entrance.

8. The coupling assembly as claimed in claim 1 further comprising an O-ring sealingly engaging said tube axially inward of said upset.

9. The coupling assembly as claimed in claim 1 wherein said retainer has four members.

10. The coupling assembly as claimed in claim 1 wherein said cap has an axially extending arm engagable with said annular face defined in said bore.

11. The coupling assembly as claimed in claim 10 wherein end of said arm includes a radially outwardly extending hook.

12. A coupling assembly for providing a fluid connection comprising:
    a female connector defining a bore, said bore extending axially inwardly into said connector from an entrance, an annular face being defined in said bore axially inwardly of said entrance;
    a tube received within said bore with an enlarged upset;
    a retainer disposed in said bore having a member contacting said upset and extending to said annular face defined in said bore to retain said tube in said bore; and
    a cap slidably mounted on said tube having a portion radially outwardly of said entrance and surrounding said entrance of said female connector, said cap further having an arm abutting said annular face defined in said bore for attaching said cap to said female connector.

13. The coupling assembly as claimed in claim 12 wherein said cap further having a protrusion for abutment with said upset to assure said tube has been properly inserted into said female connector.

14. The coupling assembly as claimed in claim 13 wherein said protrusion has a terminal surface for abutment with said upset.

15. The coupling assembly as claimed in claim 12 wherein said portion of said cap has a diameter at least as large as the outer diameter of said female connector radially outward of said entrance.

16. The coupling assembly as claimed in claim 12 further comprising an O-ring sealingly engaging said tube axially inward of said upset.

17. The coupling assembly as claimed in claim 12 wherein said retainer has four members.

18. The coupling assembly as claimed in claim 12 wherein said arm extends axially.

19. The coupling assembly as claimed in claim 12 wherein an end of said arm includes a radially outwardly extending hook.

* * * * *